(12) United States Patent
Okazaki et al.

(10) Patent No.: US 12,240,041 B2
(45) Date of Patent: Mar. 4, 2025

(54) BUILD REGION LIMITATION UNIT AND ADDITIVE MANUFACTURING APPARATUS HAVING THE SAME

(71) Applicant: Sodick Co., Ltd., Kanagawa (JP)

(72) Inventors: Shuji Okazaki, Kanagawa (JP); Katsuhiro Nakano, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 104 days.

(21) Appl. No.: 18/299,071

(22) Filed: Apr. 12, 2023

(65) Prior Publication Data

US 2023/0347417 A1    Nov. 2, 2023

(30) Foreign Application Priority Data

Apr. 27, 2022    (JP) ................ 2022-073304

(51) Int. Cl.
*B22F 12/30*    (2021.01)
*B22F 12/67*    (2021.01)
*B33Y 30/00*    (2015.01)

(52) U.S. Cl.
CPC ........... *B22F 12/30* (2021.01); *B22F 12/67* (2021.01); *B33Y 30/00* (2014.12)

(58) Field of Classification Search
CPC ........ B29C 64/153; B29C 64/25; B22F 12/30
See application file for complete search history.

(56) References Cited

U.S. PATENT DOCUMENTS

| | | | |
|---|---|---|---|
| 10,569,331 B2 | 2/2020 | Kawada et al. | |
| 2007/0026099 A1 | 2/2007 | Hagiwara | |
| 2011/0252618 A1* | 10/2011 | Diekmann | B29C 67/04 29/401.1 |
| 2016/0257072 A1 | 9/2016 | Okamoto et al. | |
| 2019/0262899 A1 | 8/2019 | Karlsson et al. | |
| 2021/0016502 A1* | 1/2021 | Kawada | B22F 12/55 |
| 2021/0229354 A1* | 7/2021 | Ackelid | B29C 64/255 |
| 2022/0118524 A1 | 4/2022 | Nakamura et al. | |

FOREIGN PATENT DOCUMENTS

| | | |
|---|---|---|
| CN | 103447528 | 12/2013 |
| JP | 2007030303 | 2/2007 |
| JP | 2011225994 | 11/2011 |
| JP | 2016159571 | 9/2016 |
| JP | 2021017603 | 2/2021 |
| JP | 6993492 | 1/2022 |

OTHER PUBLICATIONS

"Search Report of Europe Counterpart Application", issued on Jun. 30, 2023, p. 1-p. 8.

* cited by examiner

*Primary Examiner* — Larry W Thrower
*Assistant Examiner* — Timothy G Hemingway
(74) *Attorney, Agent, or Firm* — JCIPRNET

(57) ABSTRACT

A build region limitation unit for an additive manufacturing apparatus includes a movable unit fixed to a build table and a non-movable unit placed on a base frame. The movable unit includes a first anti-scattering frame provided to protrude upward. The non-movable unit includes a flat plate that covers a first build region with a portion other than an opening and forms a second build region, and a second anti-scattering frame that is provided to protrude downward at an outer periphery of the opening. The first anti-scattering frame surrounds the second anti-scattering frame with a gap therebetween.

7 Claims, 18 Drawing Sheets

BUILD REGION LIMITATION UNIT AND ADDITIVE MANUFACTURING APPARATUS HAVING THE SAME

CROSS-REFERENCE TO RELATED APPLICATION

This application claims the priority benefits of Japanese application No. 2022-073304, filed on Apr. 27, 2022. The entirety of the above-mentioned patent application is hereby incorporated by reference herein and made a part of this specification.

BACKGROUND

Technical Field

The disclosure relates to a build region limitation unit and an additive manufacturing apparatus having the same.

Description of Related Art

An additive manufacturing apparatus that performs powder bed fusion forms a material layer by spreading material powder in a build region which is a region where a desired three-dimensional object can be formed. The additive manufacturing apparatus irradiates the material layer with a laser beam or an electron beam to sinter or melt the material powder and form a solidified layer. The additive manufacturing apparatus repeats formation of a material powder layer and formation of a solidified layer to manufacture a desired three-dimensional object.

There are many types of material powders for use in additive manufacturing. A single additive manufacturing apparatus may use multiple types of materials, and when different materials are used, work related to material replacement is performed. In replacing the material, it is necessary to clean the additive manufacturing apparatus and remove the existing material inside.

The additive manufacturing apparatus disclosed in U.S. Pat. No. 10,569,331 is configured to recover excess material generated during manufacturing, remove impurities, and then supply the material to the additive manufacturing apparatus main body again. A device for recovering and re-supplying the excess material is hereinafter referred to as a material reuse unit. When replacing the material, it is necessary to clean not only the additive manufacturing apparatus main body but also the material reuse unit.

The additive manufacturing apparatus disclosed in U.S. Patent Publication No. US 2022/0118524 is configured such that the material reuse unit can be separated from the additive manufacturing apparatus main body. By preparing a material reuse unit for each material powder, it is unnecessary to clean the material reuse unit in replacing the material, which reduces the time and effort for material replacement.

SUMMARY

Problems to be Solved

Small three-dimensional objects are sometimes manufactured experimentally using material powder that is different from usual. For example, when considering use of new material powder, a test piece may be manufactured using the material powder to measure the physical properties of the test piece and collect the irradiation conditions of the laser beam or electron beam.

The conventional additive manufacturing apparatus is designed corresponding to the maximum manufacturing size, so a relatively large amount of material powder is used. For example, in forming the material layer, the material powder is spread over a range that is actually required. Therefore, it is necessary to prepare a certain amount of material powder even when manufacturing a small three-dimensional object.

In addition, as described above, cleaning is required in replacing the material. As disclosed in U.S. Pat. No. 10,569,331, it is known to prepare a material reuse unit for each material in order to reduce the time and effort for material replacement. However, preparing a dedicated material reuse unit for the material powder used for experiment increases costs.

In view of such circumstances, the disclosure provides a build region limitation unit suitable for additive manufacturing a small three-dimensional object such as a test piece simply using a small amount of material powder, and an additive manufacturing apparatus having the same.

Means for Solving the Problems

According to an embodiment of the disclosure, a build region limitation unit is provided for an additive manufacturing apparatus including a base frame which has a first build region that is a region capable of forming a three-dimensional object, and a build table which is provided in the first build region and configured to be movable in a vertical direction and in which a base plate is arranged, and the additive manufacturing apparatus alternately repeats formation of a material layer composed of material powder and formation of a solidified layer. The build region limitation unit includes: a movable unit fixed to the build table; and a non-movable unit placed on the base frame. The movable unit includes: a first anti-scattering frame that is a hollow frame provided to protrude upward. The non-movable unit includes: a flat plate which is a plate having an opening and placed on the base frame, covers the first build region with a portion other than the opening, and forms a second build region smaller than the first build region; and a second anti-scattering frame which is a hollow frame provided to protrude downward at an outer periphery of the opening. The first anti-scattering frame surrounds the second anti-scattering frame with a gap therebetween.

Effects

The build region limitation unit according to the disclosure makes it easy to manufacture a small three-dimensional object using material powder different from usual. The build region limitation unit also reduces the burden related to cleaning work at the time of material replacement.

DESCRIPTION OF THE EMBODIMENTS

Figure 16:
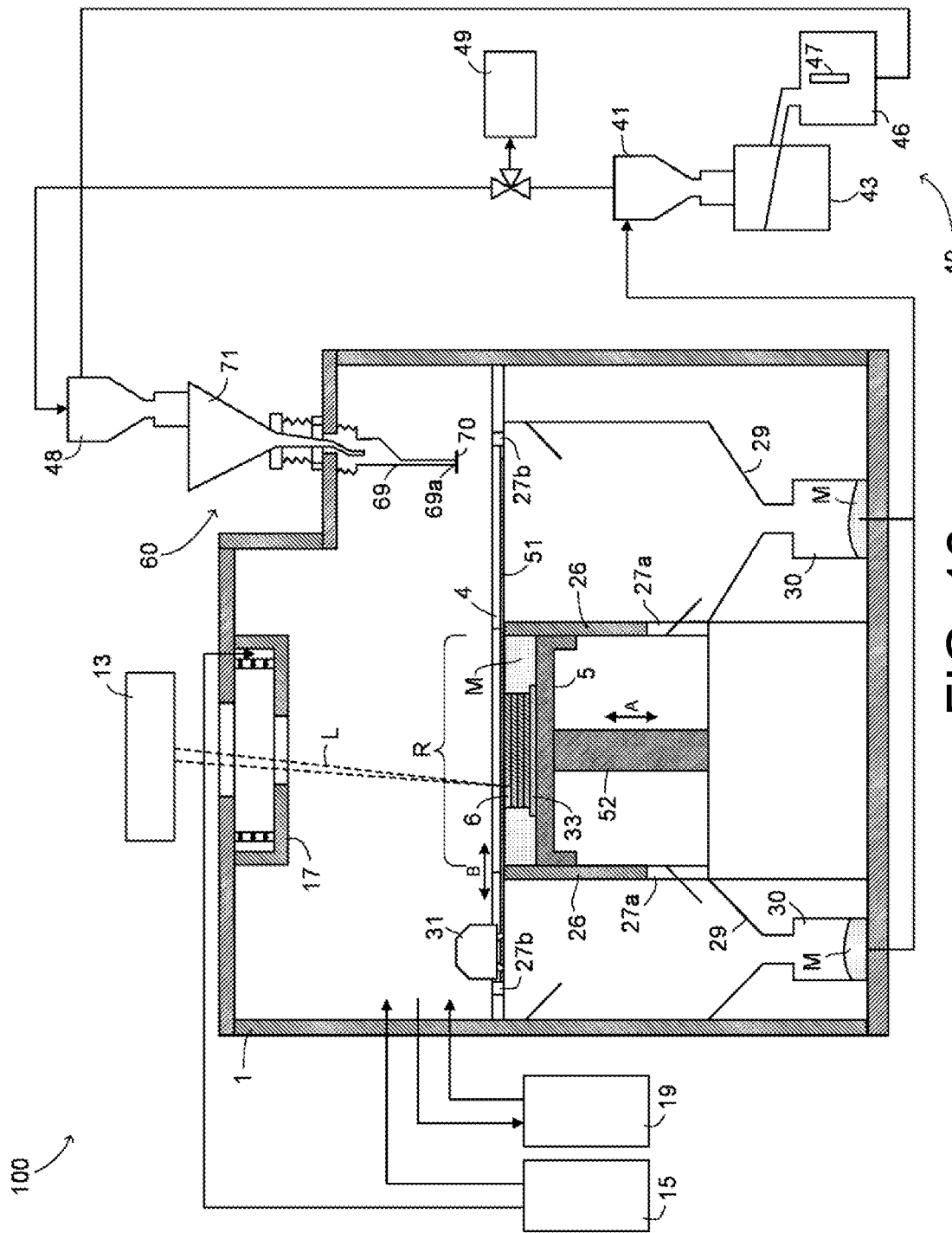
FIG. 16 is a schematic configuration view of the additive manufacturing apparatus 100 with the build region limitation unit removed.
Figure 17:
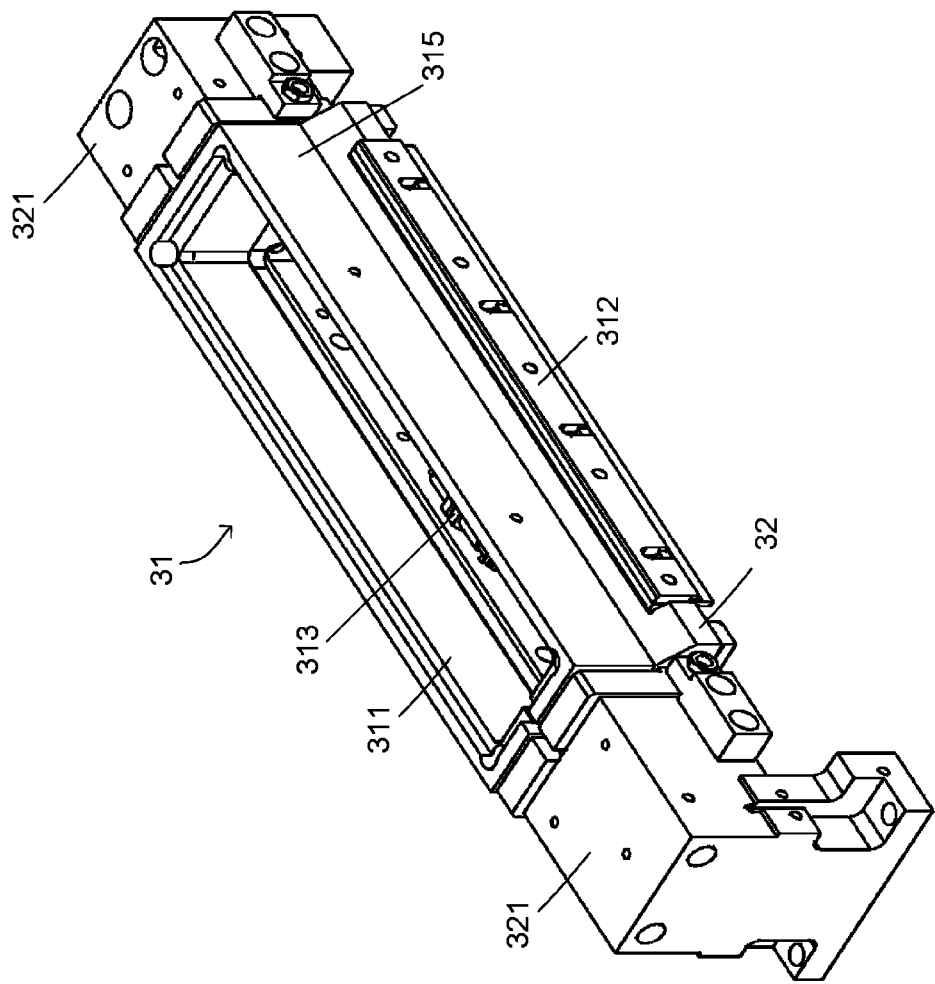
FIG. 17 is a perspective view of the first build region recoater head.
Figure 18:
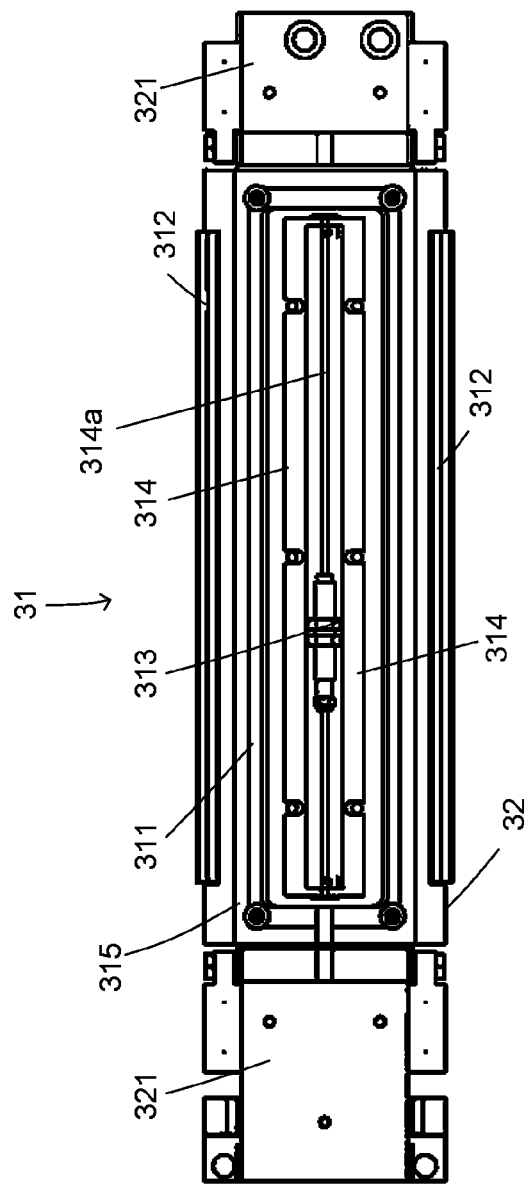
FIG. 18 is a top view of the first build region recoater head.

Embodiments of the disclosure will be described hereinafter with reference to the drawings. Various features shown in the embodiments shown hereinafter may be combined with each other. FIG. 1 to FIG. 15 illustrate an additive manufacturing apparatus or parts thereof when additive manufacturing is performed using a build region limitation unit 8. FIG. 16 to FIG. 18 illustrate an additive manufacturing apparatus or parts thereof when additive manufacturing is performed without using the build region limitation unit 8.

Figure 1:
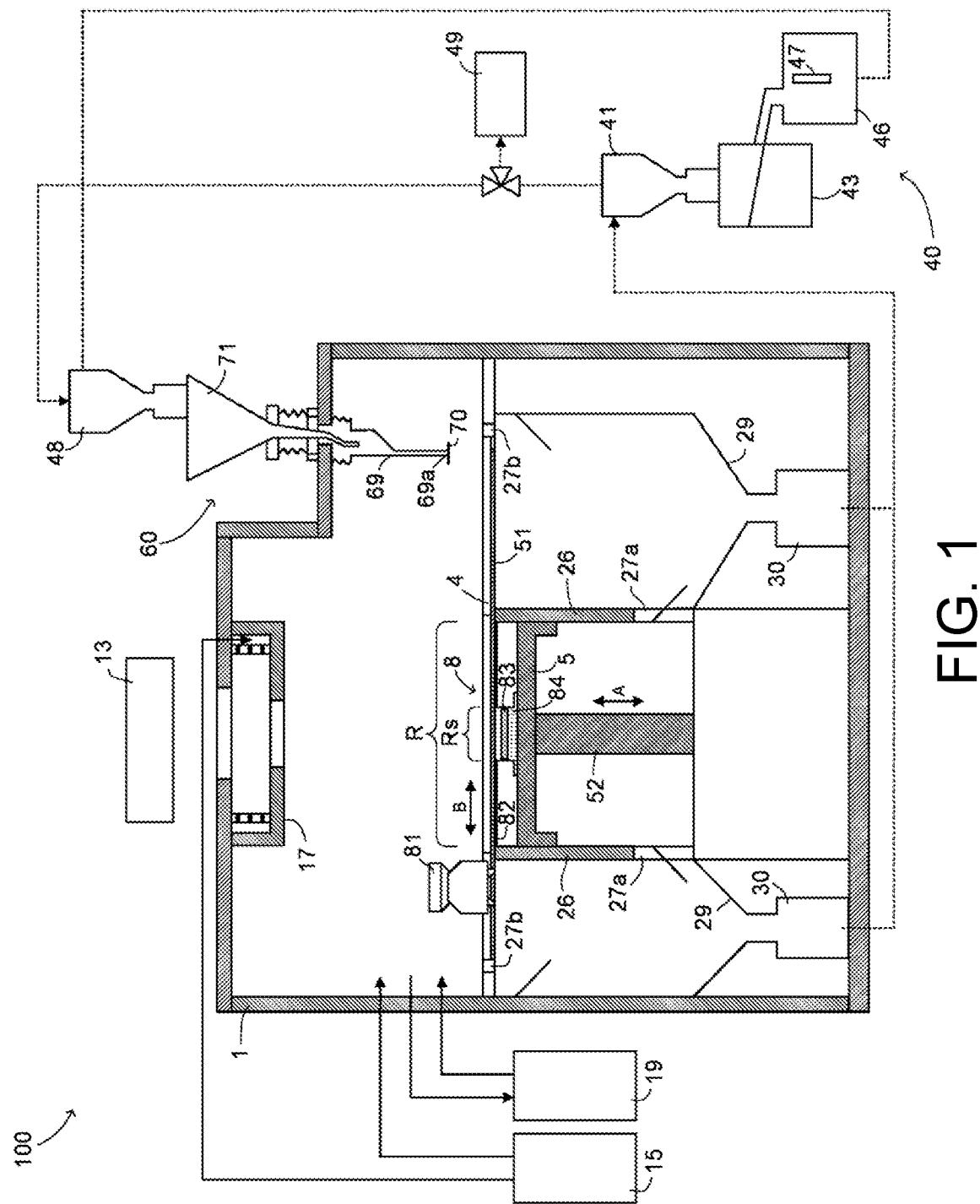
FIG. 1 is a schematic configuration view of the additive manufacturing apparatus to which the build region limitation unit is attached.
Figure 2:
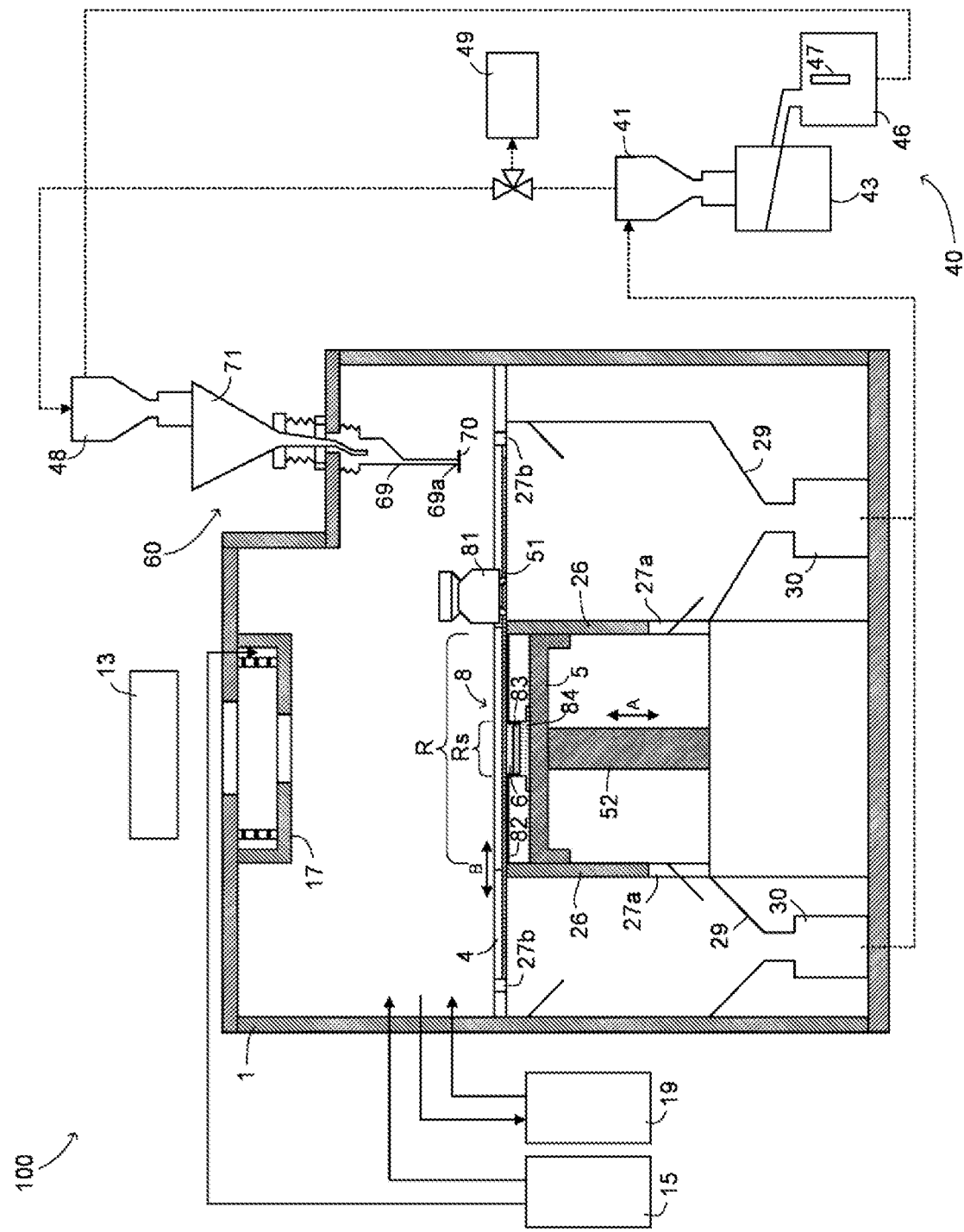
FIG. 2 is a schematic configuration view of the additive manufacturing apparatus to which the build region limitation unit is attached.

The additive manufacturing apparatus 100 according to this embodiment repeats formation of a material layer 6 composed of material powder M and formation of a solidified layer to manufacture a desired three-dimensional object K. As shown in FIG. 1, FIG. 2, and FIG. 16, the additive manufacturing apparatus 100 includes a chamber 1, an irradiator 13, an inert gas supply device 15, a fume collector 19, a build table drive mechanism 52, a first build region recoater head 31, a base frame 4, a material recovery unit 40, a build table 5, a recoater head drive mechanism 51, a material supply unit 60, and the build region limitation unit 8. Some components may be removed or not used, as described later. The base frame 4 has a first build region R and a second build region Rs, which are regions for forming the three-dimensional object K. The first build region R contains the second build region Rs. That is, the second build region Rs is a portion in the first build region R and exists within the first build region R. The material recovery unit 40 and the material supply unit 60 constitute a material reuse unit in this embodiment.

FIG. 16 shows a mode of the additive manufacturing apparatus 100 when additive manufacturing is performed using the first build region R. Typically, the first build region R is used when additive manufacturing a product sequentially. At this time, the material reuse unit, that is, the material recovery unit 40 and the material supply unit 60, and the first build region recoater head 31 are used. Specifically, first, the first build region recoater head 31 is moved in the first horizontal direction (the direction of the arrow B) by the recoater head drive mechanism 51, and a material layer 6 is formed on a base plate 33 placed on the build table 5. Then, the irradiator 13 irradiates the material layer 6 with a laser beam L to form a solidified layer. The build table 5 is lowered by one layer, a material layer 6 is formed on the solidified layer in the same procedure, and the material layer 6 is irradiated with the laser beam L to form a solidified layer. In this way, the formation of the material layer 6 and the formation of the solidified layer are alternately repeated to manufacture the three-dimensional object K.

An excess material, which is unsolidified material powder M, is generated during the additive manufacturing. Spatters scattered during the formation of the solidified layer may be mixed with the excess material as impurities. When the solidified layer is cut, cutting chips may also be mixed as impurities. The excess material is extruded by the moving first build region recoater head 31 and discharged from a material recovery port 27b which is an opening formed in the base frame 4. Further, a material recovery port 27a which is an opening is formed in the lower portion of material holding walls 26 surrounding the build table 5. After manufacturing the three-dimensional object K, the excess material is discharged from the material recovery port 27a by lowering the build table 5. Alternatively, after the build table 5 is raised, the excess material may be dropped into the material recovery port 27b with a brush or the like. The excess material may be discharged by other means such as a suction nozzle. The discharged excess material is guided to a chute 29 and contained in a bucket 30. The impurities are then removed by the material recovery unit 40, and the remaining material is sent to the material supply unit 60. The material supply unit 60 supplies unused material powder M or material powder M with impurities removed by the material recovery unit 40 to a material case 311 of the first build region recoater head 31. The above processes are repeated so as to additive manufacture the three-dimensional object K continuously.

FIG. 1 and FIG. 2 show a mode of the additive manufacturing apparatus 100 when additive manufacturing is performed using only the second build region Rs. Typically, the second build region Rs is used when a small three-dimensional object K such as a test piece is additive manufactured experimentally using material powder M different from usual. At this time, while the build region limitation unit 8 is used, the material powder M is not supplied from the material supply unit 60 and excess material is not recovered from the material recovery ports 27a and 27b. As the recovery system and the supply system for the material powder M, including the material recovery unit 40 and the material supply unit 60 which are the material reuse unit, are not used, different types of materials, typically, the material powder M for mass production and the material powder M for experiment are prevented from being mixed. Thus, the work load such as cleaning when switching between the two material powders M is reduced. If the material reuse unit is configured to be separable from the chamber 1, the material reuse unit may be removed when the build region limitation unit 8 is used.

The chamber 1 covers the first build region R and the second build region Rs which are regions in which the three-dimensional object K is formed. The chamber 1 includes a plurality of side plates and an upper plate, and one of the side plates is provided with a door that can be opened and closed. The door may be provided with a glove box. The chamber 1 is filled with inert gas of a predetermined concentration. In this specification, the inert gas is gas that does not substantially react with the material powder M, such as nitrogen gas, argon gas, and helium gas. The material powder M is, for example, powder of metal.

The irradiator 13 is provided above the chamber 1. The irradiator 13 irradiates a predetermined portion of the material layer 6 formed on the first build region R or the second build region Rs with the laser beam L to melt or sinter the material powder M at the irradiated position and form a solidified layer. More specifically, the irradiator 13 of this embodiment includes a beam source that outputs the laser beam L and a scanner that scans the laser beam L. The scanner is, for example, a galvanometer scanner having an X-axis galvanometer mirror and a Y-axis galvanometer mirror. The laser beam L is, for example, a $CO_2$ laser, a fiber laser, or a YAG laser. The laser beam L emitted from the irradiator 13 passes through a window provided on the upper plate of the chamber 1 and is irradiated on the material layer 6. The irradiator 13 may be a device that irradiates the material layer 6 with an electron beam to form a solidified layer. For example, the irradiator 13 may include a cathode electrode that emits electrons, an anode electrode that converges and accelerates electrons, a solenoid that forms a magnetic field and converges the direction of the electron beam in one direction, and a collector electrode that is electrically connected to the material layer to be irradiated and applies a voltage between the material layer and the cathode electrode.

A cutting device may be provided in the chamber 1. The cutting device cuts the surface or unnecessary portions of the solidified layer. The cutting device includes, for example, a machining head that is configured to be movable within the chamber 1, and a spindle that is provided on the machining head and grips and rotates a cutting tool.

As shown in FIG. 1, FIG. 2, and FIG. 16, the inert gas supply device 15 and the fume collector 19 are connected to the chamber 1. The inert gas supply device 15 is, for example, an inert gas generator that generates inert gas from air, or a gas cylinder that stores inert gas. The inert gas supply device 15 supplies inert gas of a predetermined concentration to the chamber 1. The fume collector 19 is an electrostatic precipitator or filter that removes fumes from the inert gas. Fumes are generated when the solidified layer is formed. The inert gas containing fumes which is discharged from the chamber 1 is sent to the fume collector 19. The inert gas from which fumes have been removed by the fume collector 19 is returned to the chamber 1. With such a configuration, the inert gas is reused.

The positions and number of inlets and outlets for the inert gas are not limited. For example, the side plate or upper plate of the chamber 1 or components arranged within the chamber 1 may be formed with inlets and outlets. The drawings do not show the actual positions and number of inlets and outlets.

A contamination prevention member 17 is provided in the chamber 1 so as to surround the window. The contamination prevention member 17 has a cylindrical shape, stores the inert gas supplied from the inert gas supply device 15 inside, and discharges downward, which prevents fumes from adhering to the window.

The material supply unit 60 and the material recovery unit 40 are provided as the material reuse unit that automatically supplies the material powder M into the chamber 1, specifically, to the first build region recoater head 31, and recovers the excess material. The material supply unit 60 and the material recovery unit 40 are not used when only the second build region Rs is used, that is, when the build region limitation unit 8 is used. An example of the material reuse unit will be described below, but the material reuse unit is not limited to the following configuration. The material reuse unit includes at least a sieve that removes impurities from the material powder M discharged from the chamber 1, and a material carrier that conveys the material powder M.

The material supply unit 60 includes a main duct 71, an intermediate duct 69, and an intermediate duct shutter 70. The main duct 71 is provided on the upper plate of the chamber 1. The intermediate duct 69 is provided below the main duct 71. An intermediate duct outlet 69a, which is an outlet of the intermediate duct 69, is opened and closed by one or more intermediate duct shutters 70. When the build region limitation unit 8 is used, the intermediate duct outlet 69a is constantly closed by the intermediate duct shutter 70. The material powder M contained in a material tank 46 is supplied to the main duct 71, passes through the intermediate duct 69, and is supplied from the intermediate duct outlet 69a to the first build region recoater head 31.

The material recovery unit 40 includes a recovery carrier 41, an impurity removal device 43, the material tank 46, a drying device 47, a supply carrier 48, and a vacuum pump 49. The recovery carrier 41 and the supply carrier 48 are so-called hopper loaders, and are connected to the vacuum pump 49 via a three-way valve. In this embodiment, the vacuum pump 49 is shared by the recovery carrier 41 and the supply carrier 48, but the vacuum pump 49 may be provided separately. By operating the vacuum pump 49, a negative pressure is generated in the recovery carrier 41 or the supply carrier 48 to convey the material powder M. The impurity removal device 43 includes, for example, a sieve. The impurity removal device 43 removes impurities from the excess material sent from the bucket 30 by the recovery carrier 41 and sends the material to the material tank 46. The material tank 46 contains unused material powder M and used material powder M with impurities removed. The material tank 46 is provided with the drying device 47 such as a heater to dry the material powder M. The material powder M contained in the material tank 46 is conveyed by the supply carrier 48 and supplied to the main duct 71 of the material supply unit 60. During the manufacture of the three-dimensional object K, the material recovery unit 40 and the material supply unit 60 may automatically recover and re-supply the material powder M. After manufacturing the three-dimensional object K, the material recovery unit 40 recovers the material powder M. At this time, the material recovery unit 40 may store the material powder M in the material tank 46 after removing impurities from the material powder M recovered via a suction nozzle or the like by the impurity removal device 43. As described above, the recovery of excess material from the material recovery ports 27a and 27b or the suction nozzle and the operations of the material recovery unit 40 and the material supply unit 60 are not performed when the build region limitation unit 8 is used.

The base frame 4 is a frame provided inside the chamber 1 and has the first build region R and the second build region Rs. The base frame 4 incorporates the build table 5, the material holding wall 26, and the bucket 30. The first build region R is typically used when additive manufacturing a product continuously. The second build region Rs is typically used when additive manufacturing a test piece for the purpose of evaluating new material powder M or the like. The second build region Rs is a part of the first build region R and is formed within the first build region R.

The build table 5 is provided in the first build region R and the second build region Rs. The build table 5 is movable in the vertical direction (the direction of the arrow A) by the build table drive mechanism 52. The build table drive mechanism 52 includes any actuator, and includes, for example, a motor and a ball screw. When additive manufacturing is performed in the second build region Rs, the movable unit 84 and a base plate 83 are arranged on the build table 5, and the first material layer 6 is formed on the base plate 83. When additive manufacturing is performed in the first build region R, the base plate 33 is arranged on the build table 5, and the first material layer 6 is formed on the base plate 33.

Figure 3:
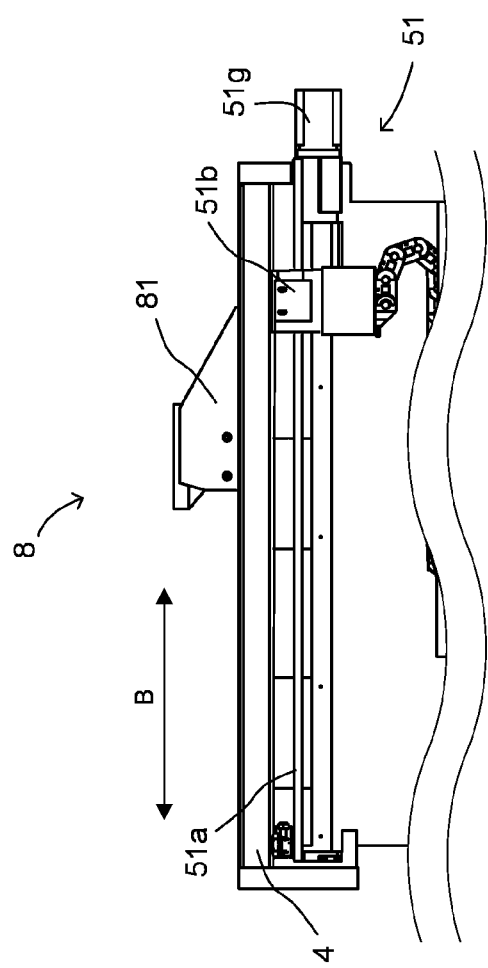
FIG. 3 is a front view of the second build region recoater head and the recoater head drive mechanism.
Figure 4:
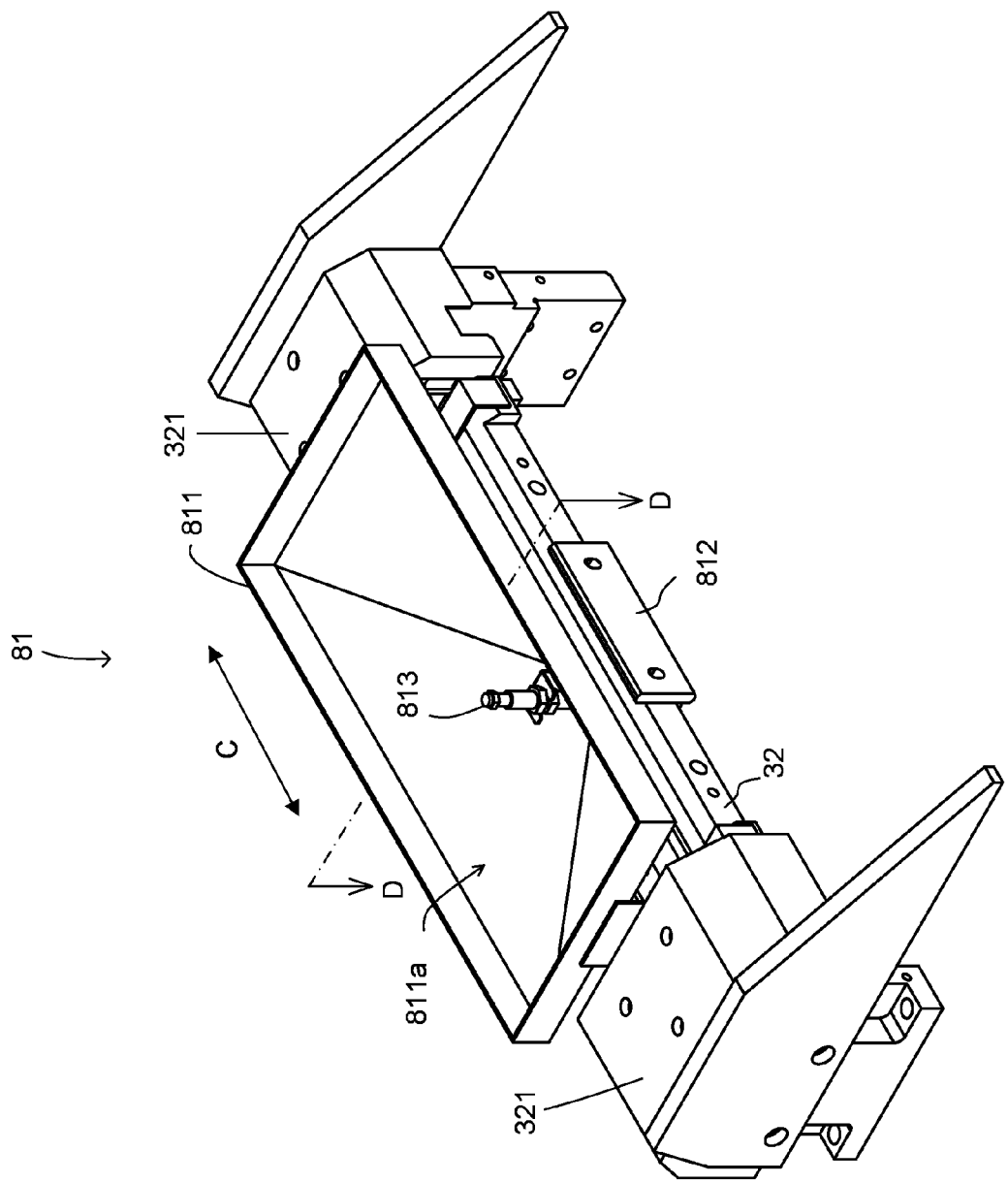
FIG. 4 is a perspective view of the second build region recoater head.
Figure 5:
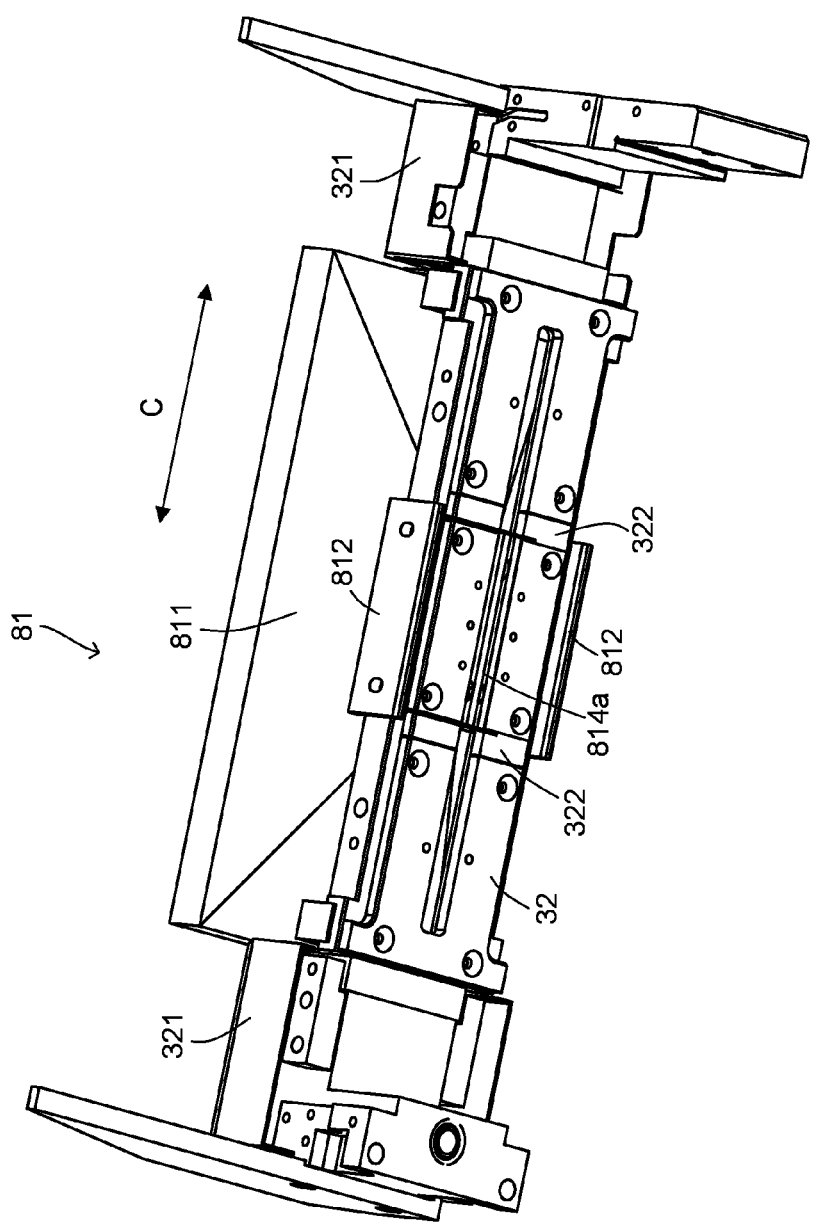
FIG. 5 is a perspective view of the second build region recoater head.
Figure 6:
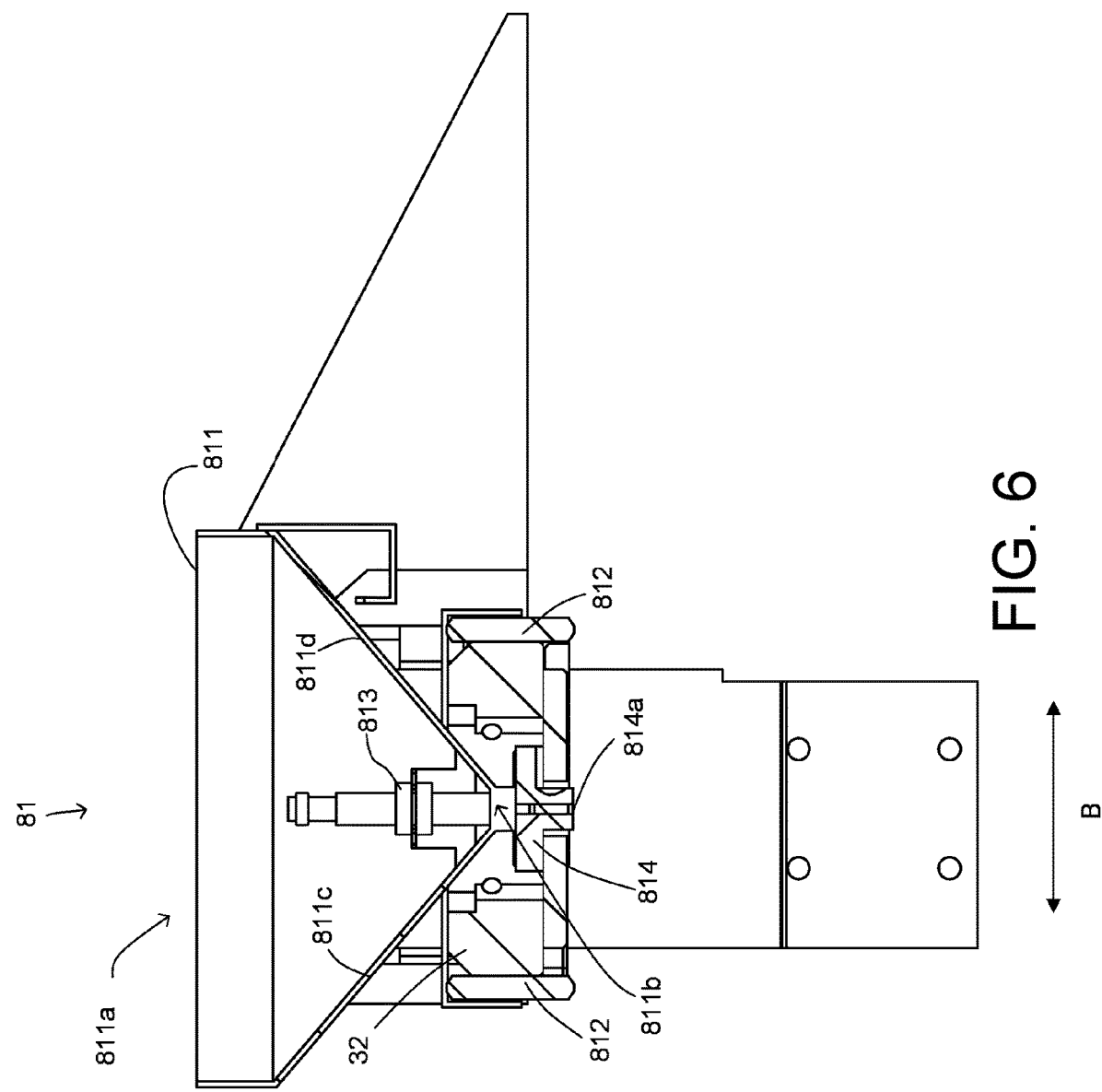
FIG. 6 is a cross-sectional view taken along the line D-D of FIG. 4.
Figure 7:
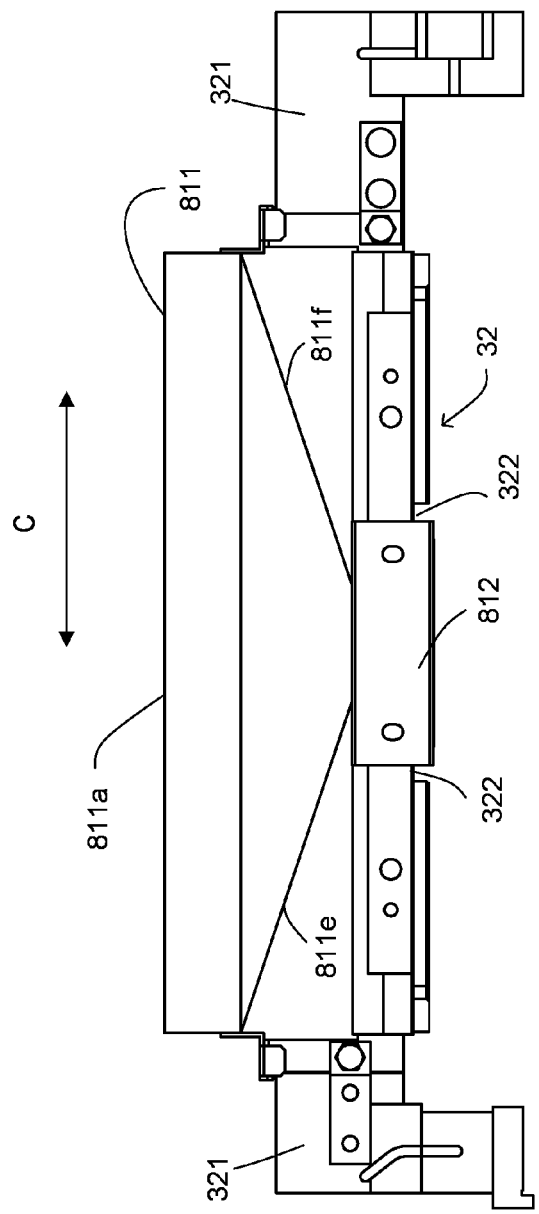
FIG. 7 is a side view of the second build region recoater head as seen from the direction of the arrow B.
Figure 8:
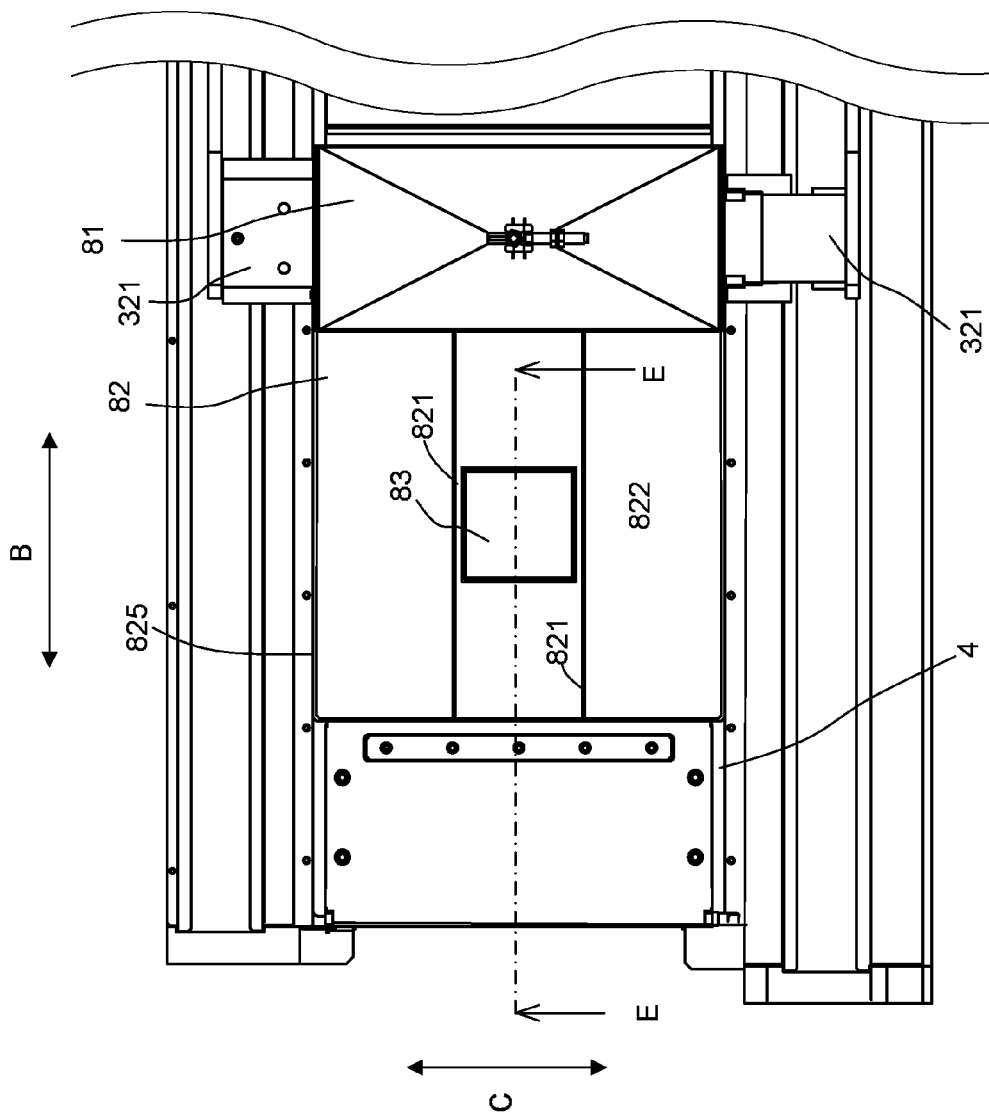
FIG. 8 is a top view of the base frame to which the build region limitation unit is attached.
Figure 9:
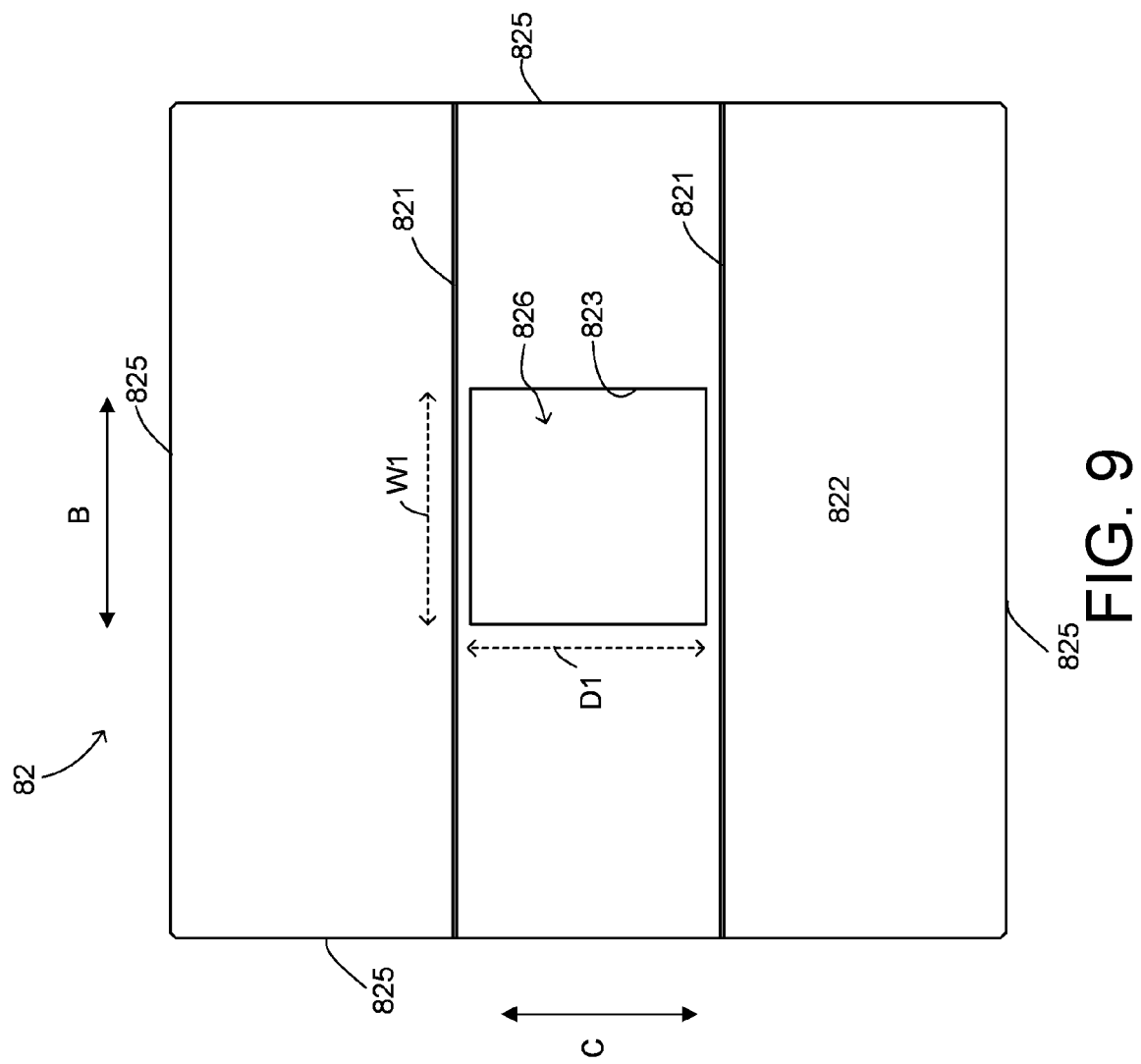
FIG. 9 is a top view of the non-movable unit.
Figure 10:
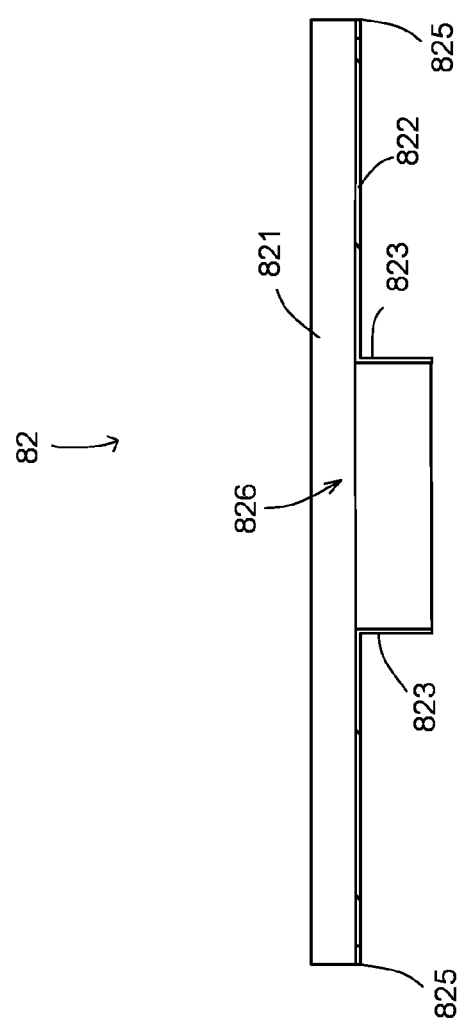
FIG. 10 is a cross-sectional view of the non-movable unit.

The recoater head drive mechanism 51 moves the second build region recoater head 81 or the first build region recoater head 31. The recoater head drive mechanism 51 includes a motor 51g, a ball screw 51a, and a slide member 51b, as shown in FIG. 3. The motor 51g rotates the ball screw 51a. The slide member 51b has a nut that is screwed onto the ball screw 51a. As will be described later, the second build region recoater head 81 and the first build region recoater head 31 share a movable body 32. The movable body 32 is fixed to the slide member 51b. The second build region recoater head 81 or the first build region recoater head 31 is configured by attaching other components to the movable body 32. In other words, the second build region recoater head 81 and the first build region recoater head 31 can be changed with each other by exchanging the components. When the slide member 51b moves with the rotation of the ball screw 51a, the second build region recoater head 81 or the first build region recoater head 31 moves in the direction of the arrow B together with the slide member 51b. The ball screw 51a is rotatably supported and rotated by the motor 51g. The recoater head drive mechanism 51 is not limited to the above configuration including the motor 51g and the ball screw 51a. The recoater head drive mechanism 51 may be configured by including any actuator, and may be, for example, a linear motor.

As shown in FIG. 17 and FIG. 18, the first build region recoater head 31 includes a material case 311, the movable body 32, a pair of blades 312, a sensor 313, a powder guide 314, and a material case support frame 315.

The material case 311 contains the material powder M supplied from the material supply unit 60. The sensor 313 detects whether there is material powder M inside the material case 311.

The movable body 32 is a base that fixes and supports the material case 311 or the material case 811. The movable body 21 is configured to be reciprocatively movable along the direction of the arrow B on the base frame 4. By moving the movable body 32 by the recoater head drive mechanism 51, the first build region recoater head 31 and the second build region recoater head 81 move in the direction of the arrow B. The movable body 32 is commonly used by the first build region recoater head 31 and the second build region recoater head 81. The movable body 32 has a substantially rectangular parallelepiped shape extending in the direction of the arrow C, which is the second horizontal direction orthogonal to the direction of the arrow B. The length of the movable body 32 in the longitudinal direction is configured to be wider than the width of the base frame 4 in the direction of the arrow C.

The guide members 321 are a pair of support bases provided at both ends of the movable body 32 in the direction of the arrow C. The guide members 321 are attached to a pair of guide rails provided on the base frame 4, respectively. The first build region recoater head 31 and the second build region recoater head 81 that are moved by the recoater head drive mechanism 51 reciprocatively move on the base frame 4 along the guide rails.

A pair of grooves 322 are provided on the lower surface of the movable body 32. When the second build region recoater head 81 moves on the base frame 4, a partition plate 821 relatively moves inside the groove 322. In other words, the upper portions of a pair of partition plates 821 are respectively inserted into the pair of grooves 322. The groove 322 extends from one end to the other end of the movable body 32 in the direction of the arrow B and is formed in a straight line.

A pair of blades 312 are provided on both side surfaces of the movable body 32 in the direction of the arrow B, respectively. The blade 312 is an elongated member extending along the direction of the arrow C. The blade 312 flattens the material powder M discharged from the material outlet 314a formed in the powder guide 314 to form the material layer 6. The length of the blade 312 in the direction of the arrow C, which is the longitudinal direction, is substantially the same as the width of the first build region R in the direction of the arrow C.

The powder guide 314 is provided directly below a case outlet, which is a discharge opening of the material case 311. The powder guide 314 is formed with the material outlet 314a which is an opening. The powder guide 314 guides the flow of the material powder M dropping from the material case 311. Thus, the material powder M is freely dropped onto the first build region R and supplied.

The material case support frame 315 is a frame that fixes and supports the material case 311 to the movable body 32. The material case support frame 315 has a substantially rectangular parallelepiped shape that is hollow and extends in the direction of the arrow C. The material case support frame 315 is attached to the upper portion of the movable body 32 and accommodates the material case 311 inside.

While discharging the material powder M stored in the material case 311 from the material outlet 314a of the powder guide 314, the first build region recoater head 31 moves in the direction of the arrow B on the first build region R. Then, the first build region recoater head 31 levels the material powder M discharged to the first build region R by the blade 312 to form the material layer 6.

The blades 312, the material case 311, the sensor 313, the powder guide 314, and the material case support frame 315 are detachably attached to the movable body 32. When the first build region recoater head 31 is replaced with the second build region recoater head 81, the blades 312, the material case 311, the sensor 313, the powder guide 314, and the material case support frame 315 that constitute the first build region recoater head 31 are removed from the movable body 32. Then, the blades 812, the material case 811, the sensor 813, and the powder guide 814 that constitute the second build region recoater head 81 are attached to the movable body 32 instead.

The build region limitation unit 8 is a device for manufacturing the three-dimensional object K within the second build region Rs. The build region limitation unit 8 is detachably attached inside the chamber 1. The build region limitation unit 8 includes the second build region recoater head 81, the non-movable unit 82, and the movable unit 84.

As shown in FIG. 3, the second build region recoater head 81 is arranged on the base frame 4 and configured to be reciprocatively movable in the direction of the arrow B by the recoater head drive mechanism 51. The second build region recoater head 81 supplies the material powder M onto the second build region Rs while moving within the chamber 1 and flattens the material powder M to form the material layer 6. That is, the second build region recoater head 81 forms the material layer 6 in the second build region Rs. As shown in FIG. 4 to FIG. 7, the second build region recoater head 81 includes the material case 811, the movable body 32, the sensor 813, a pair of blades 812, and the powder guide 814.

The material case 811 is a container that contains the material powder M inside. The material case 811 is supported by the movable body 32. The material case 811 has a shape extending in the direction of the arrow C orthogonal to the direction of the arrow B, which is the moving direction of the second build region recoater head 81. The volume of the material case 811 is designed to be as large as possible so that the three-dimensional object K can be manufactured by introducing the material powder M only once. Specifically, the maximum length of the material case 811 in the direction of the arrow C, which is the longitudinal direction, is configured to be substantially the same as the width of the base frame 4 in the direction of the arrow C. In addition, the upper surface of the material case 811 is fixed to protrude upward from the upper surface of the movable body 32. However, the size of the material case 811 is determined in consideration of mechanical constraints such as that the material powder M drops appropriately within the material case 811, that the flow of the inert gas is not blocked, and that an excessive load is not applied to the movement of the second build region recoater head 81. The material case 811 has a material inlet 811a, a case outlet 811b, a first inclined surface 811c, a second inclined surface 811d, a third inclined surface 811e, and a fourth inclined surface 811f.

The material inlet 811a is an opening for introducing the material powder M. The material inlet 811a is formed on the upper surface of the material case 811 and has a substantially rectangular shape extending in the direction of the arrow C. The length of the material inlet 811a in the direction of the arrow C is configured to be the same as the width of the base frame 4 in the direction of the arrow C. The case outlet 811b is a substantially rectangular opening through which the material powder M is discharged from the material case 811. The case outlet 811b is formed on the lower surface of the material case 811 and extends in substantially the same direction as the material outlet 814a of the powder guide 814.

The first inclined surface 811c and the second inclined surface 811d are trapezoidal flat plates arranged along the direction of the arrow C across the case outlet 811b. The first inclined surface 811c and the second inclined surface 811d are inclined toward the case outlet 811b. The inclination angle of the first inclined surface 811c, that is, the angle formed by the first inclined surface 811c and the horizontal plane, and the inclination angle of the second inclined surface 811d, that is, the angle formed by the second inclined surface 811d and the horizontal plane, may be different from each other or may be the same. Practically, the inclination angle of the first inclined surface 811c and the inclination angle of the second inclined surface 811d are angles that allow the material powder M to slide down.

The third inclined surface 811e and the fourth inclined surface 811f are trapezoidal flat plates arranged along the direction of the arrow B across the case outlet 811b. The third inclined surface 811e and the fourth inclined surface 811f are inclined toward the case outlet 811b. The inclination angle of the third inclined surface 811e, that is, the angle formed by the third inclined surface 811e and the horizontal plane, and the inclination angle of the fourth inclined surface 811f, that is, the angle formed by the fourth inclined surface 811f and the horizontal plane, may be different from each other or may be the same. Practically, the inclination angle of the third inclined surface 811e and the inclination angle of the fourth inclined surface 811f are angles that allow the material powder M to slide down.

The first inclined surface 811c, the third inclined surface 811e, and the fourth inclined surface 811f are arranged adjacent to each other, and the second inclined surface 811d, the third inclined surface 811e, and the fourth inclined surface 811f are arranged adjacent to each other. Therefore, the lower portion of the material case 811 has an inverted truncated pyramid shape. As the lower portion of the material case 811 has an inverted truncated pyramid shape, the material powder M stored inside the material case 811 flows along the inclined surfaces 811c, 811d, 811e, and 811f toward the case outlet 811b. Thus, the amount of the material powder M discharged from the case outlet 811b is stabilized, and the amount of the material powder M discharged from the powder guide 814 is thus stabilized.

The sensor 813 for detecting whether there is material powder M in the material case 811 is fixed to the case outlet 811b of the material case 811. When the sensor 813 determines that the material case 811 needs to be replenished with the material powder M, the second build region recoater head 81 is temporarily stopped. A bottle in which the material powder M is stored may be provided at a place in the chamber 1 that does not interfere with the additive manufacturing. By doing so, the operator can replenish the material powder M from the bottle to the material case 811 through the glove box on the door. In this way, even when the material powder M needs to be replenished, the additive manufacturing can be restarted without opening the door during additive manufacturing.

The pair of blades 812 are provided on both side surfaces of the movable body 32 in the direction of the arrow B, respectively. The installation position of the blade 812 is substantially the center position of the movable body 32 in the direction of the arrow C. The blade 812 has a substantially rectangular shape extending along the direction of the arrow C, and the length of the blade 812 is shorter than the length of the blade 312. The blade 812 levels the material powder M discharged from the material outlet 814a formed in the powder guide 814 to form the material layer 6. The length of the blade 812 in the direction of the arrow C, which is the longitudinal direction, is substantially the same as the width of the second build region Rs in the direction of the arrow C. When the blade 812 is attached to the movable body 32, the blade 812 is arranged inside the pair of partition plates 821 of the non-movable unit 82.

The powder guide 814 is provided directly below the case outlet 811b of the material case 811. The powder guide 814 guides the flow of the material powder M dropping from the case outlet 811b of the material case 811. Thus, the material powder M is freely dropped onto the second build region Rs and supplied. The powder guide 814 has a through hole through which the material powder M drops. The inlet of the through hole communicates with the case outlet 811b of the material case 811. The outlet of the through hole is the material outlet 814a. The material powder M contained in the material case 811 is discharged from the material outlet 814a. The material outlet 814a extends in the direction of the arrow C, and the length in the direction of the arrow C is substantially the same as the width of the second build region Rs in the direction of the arrow C. When the powder guide 814 is attached to the movable body 32, the material outlet 814a of the powder guide 814 is arranged inside the pair of partition plates 821 of the non-movable unit 82.

The pair of blades 812, the material case 811, the sensor 813, and the powder guide 814 are detachably attached to the movable body 32.

In order to prevent clogging of the material powder M in the material case 811 and expedite the discharge, the second build region recoater head 81 may be vibrated. For example, by repeatedly switching the motor 51g of the recoater head drive mechanism 51 between forward rotation and reverse rotation, the second build region recoater head 81 moves back and forth along the direction of the arrow B. Thus, the second build region recoater head 81 is vibrated. The means for applying vibration to the second build region recoater head 81 is not limited to the motor 51g. For example, an ultrasonic vibrator may be provided outside the side surface of the material case 811 to vibrate the second build region recoater head 81. The vibrating means such as the motor 51g and the ultrasonic vibrator may be controlled by a controller (not shown). In addition, clogging of the material powder M may be prevented by optimizing the inclination angles of the inclined surfaces 811c, 811d, 811e, and 811f or the area of the case outlet 811b. For example, the inclination angle of the first inclined surface 811c and the inclination angle of the second inclined surface 811d are made different, or the inclination angle of the third inclined surface 811e and the inclination angle of the fourth inclined surface 811f are made different so as to generate eccentricity in the inverted truncated pyramid shape and make it more difficult for the material powder M to clog.

The non-movable unit 82 shown in FIG. 8 to FIG. 10 and FIG. 13 is a frame detachably placed on the base frame 4. The non-movable unit 82 is placed on the base frame 4 inside the chamber 1 so as to cover the first build region R other than the second build region Rs.

The non-movable unit 82 includes a flat plate 822, a pair of partition plates 821, and a second anti-scattering frame 823. An outer edge 825 of the flat plate 822 has a substantially rectangular shape. A substantially rectangular opening 826 is formed at the center position of the flat plate 822. The flat plate 822 is a plate that covers the first build region R with a portion other than the opening 826. The flat plate 822 having the opening 826 forms the second build region Rs that is smaller than the first build region R. The base plate 83 is arranged inside the opening 826, and a relatively small three-dimensional object K such as a test piece is manufactured in the opening 826. In other words, the region inside the opening 826 constitutes the second build region Rs.

The partition plates 821 are a pair of flat plates arranged along the direction of the arrow B across the opening 826. The partition plate 821 is erected on the upper surface of the flat plate 822. The partition plate 821 prevents the material powder M supplied from the material outlet 814a of the second build region recoater head 81 from scattering outside the region sandwiched by the partition plates 821. The partition plate 821 extends from one end to the other end of the non-movable unit 82 in the direction of the arrow B, protrudes upward, and is erected on the flat plate 822. The positions of the partition plates 821 in the direction of the arrow C match the positions of the grooves 322 of the movable body 32, respectively. The height of the partition plate 821 is set so that the upper surface of the partition plate 821 does not interfere with the second build region recoater head 81 when the second build region recoater head 81 moves in the direction of the arrow B.

The second anti-scattering frame 823 is provided to cover the outer periphery of the opening 826. The second anti-scattering frame 823 is a hollow rectangular frame and is provided so as to cover the outer periphery of the opening 826. The second anti-scattering frame 823 protrudes downward and is vertically fixed to the flat plate 822. Here, the length of the outer edge of the second anti-scattering frame 823 in the direction of the arrow C is defined as the width D1, and the length of the outer edge in the direction of the arrow B is defined as the width W1.

Figure 11:
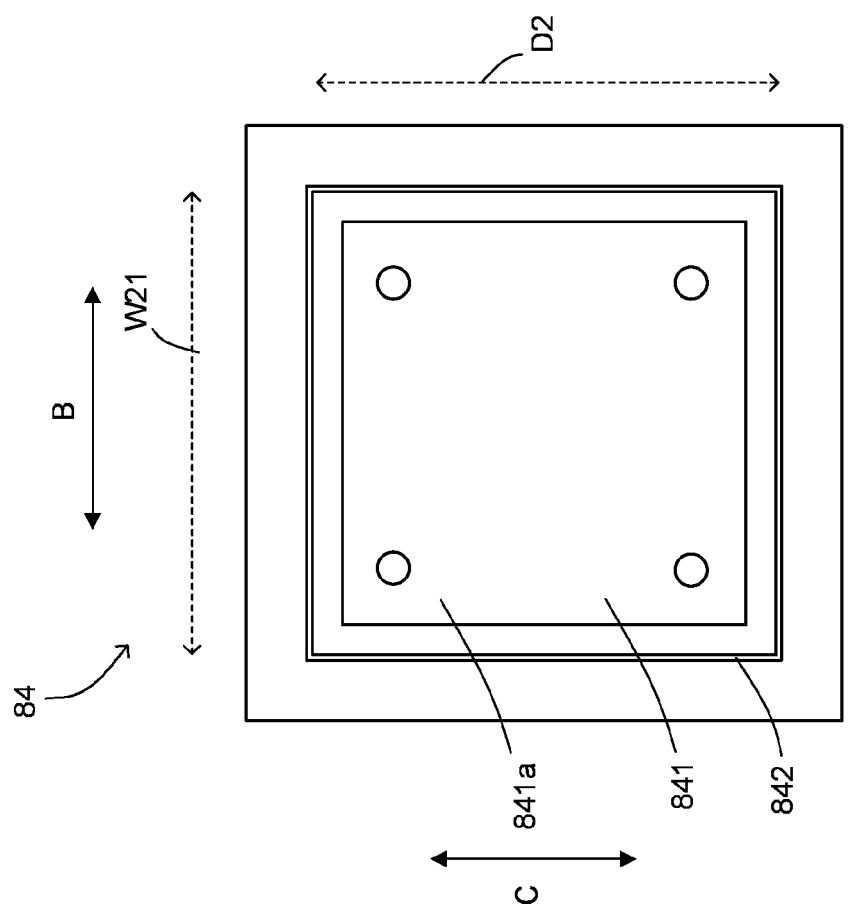
FIG. 11 is a top view of the movable unit.
Figure 12:
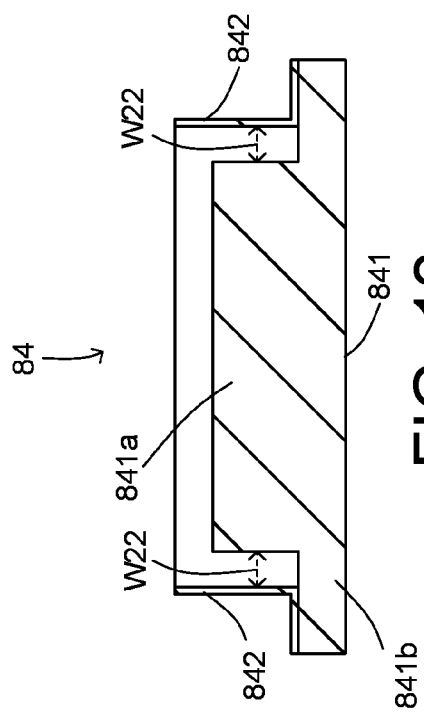
FIG. 12 is a cross-sectional view of the movable unit.
Figure 13:
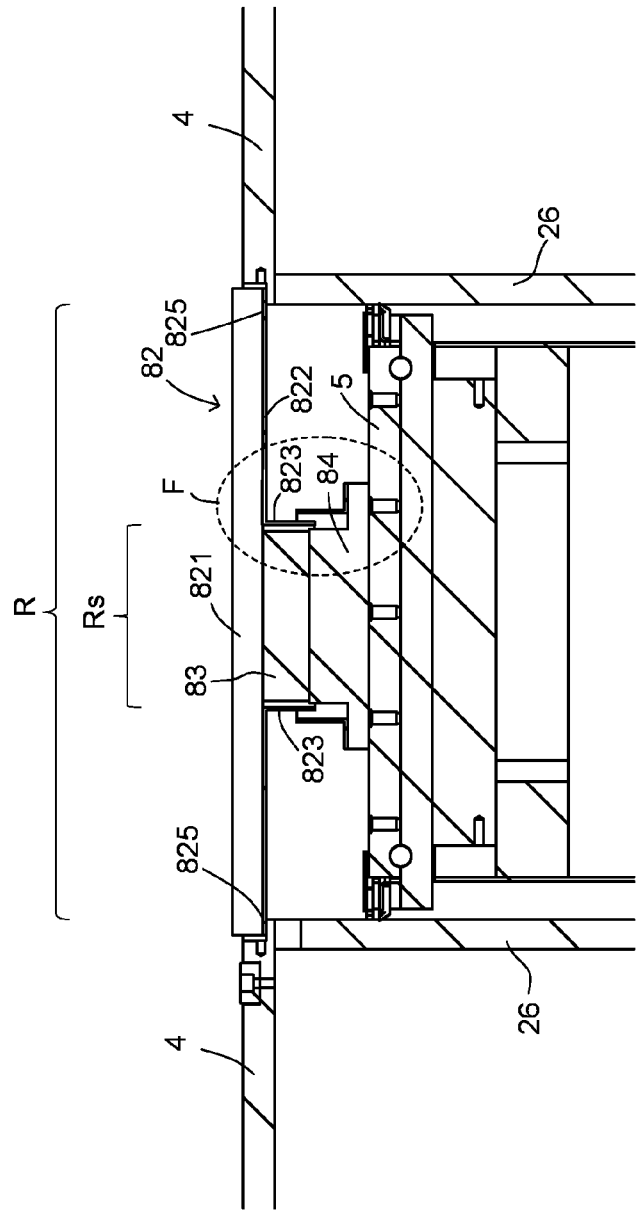
FIG. 13 is a cross-sectional view taken along the line E-E of FIG. 8.

The movable unit 84 shown in FIG. 11 to FIG. 13 is detachably fixed onto the build table 5. The movable unit 84 includes a pedestal 841 and a first anti-scattering frame 842.

The pedestal 841 is fixed onto the build table 5. The pedestal 841 includes a lower plate 841b having a rectangular cross section and an upper plate 841a having a rectangular cross section. The area of the upper surface of the upper plate 841a is smaller than the area of the upper surface of the lower plate 841b. The upper plate 841a is integrally fixed to the center of the upper surface of the lower plate 841b. The base plate 83 is directly fixed to the upper plate 841a. The first anti-scattering frame 842 is attached to the lower plate 841b. The lower plate 841b is fixed to the build table 5.

The first anti-scattering frame 842 prevents the material powder M supplied to the second build region Rs from scattering onto the build table 5. The first anti-scattering frame 842 is provided at the outer peripheries of the base plate 83 and the upper plate 841a, and surrounds the side surface of the upper plate 841a. A gap W22 is formed between the first anti-scattering frame 842 and the side surface of the upper plate 841a. The first anti-scattering frame 842 is a hollow rectangular frame and is erected on the upper surface of the lower plate 841b. The first anti-scattering frame 842 is provided to protrude upward. Here, the length of the opening of the first anti-scattering frame 842 in the direction of the arrow C is defined as the width D2, and the length of the opening in the direction of the arrow B is defined as the width W21. The opening of the first anti-scattering frame 842 is formed larger than the outer edge of the second anti-scattering frame 823. That is, in comparison with the size of the outer edge of the second anti-scattering frame 823, the relationships of D2>D1 and W21>W1 are established. The first anti-scattering frame 842 surrounds the second anti-scattering frame 823 with a gap therebetween.

The base plate 83 is a plate used when manufacturing a relatively small three-dimensional object K such as a test piece. The material powder M is spread on the upper surface of the base plate 83 to form the first material layer 6. The base plate 83 has, for example, a rectangular cross section. The size of the upper surface of the base plate 83 and the size of the upper plate 841a of the pedestal 841 are smaller than the size of the opening of the second anti-scattering frame 823. In this way, the outer surfaces of the base plate 83 and the upper plate 841a are prevented from coming into contact with the inner surface of the second anti-scattering frame 823 when the build table 5 moves in the vertical direction.

The lower plate 841b of the movable unit 84 is fixed to the build table 5 via bolts or the like. The base plate 83 is fixed to the upper surface of the upper plate 841a of the movable unit 84 via bolts or the like. The base plate 83 is positioned inside the opening 826 of the non-movable unit 82 in top view. Therefore, when the build table 5 moves in the vertical direction, the base plate 83 moves in the vertical direction inside the opening 826, that is, in the second build region Rs. In this embodiment, the pedestal 841 and the base plate 83 have substantially square flat surfaces, but not limited thereto.

A plurality of non-movable units 82 and a plurality of movable units 84 may be prepared as the build region limitation unit 8. That is, the non-movable unit 82 and the movable unit 84 with suitable specifications may be used according to the size of the three-dimensional object K to be additive manufactured. Specifically, the non-movable units 82 may differ in the size of the opening 826 or the height of the second anti-scattering frame 823. The movable unit 84 that is suitable for each non-movable unit 82 is prepared. Specifically, the movable units 84 may differ in the size of the pedestal 841 in the horizontal direction, the height of the pedestal 841, the size of the opening of the first anti-scattering frame 842, or the height of the first anti-scattering frame 842. The base plate 83 having a suitable size may be selected according to the size of the three-dimensional object K to be additive manufactured. The longitudinal and lateral sizes of the base plate 83 need to be smaller than the opening 826. Although the thickness of the base plate 83 may be selected freely, the base plate 83 is preferably thin within a range that does not cause deformation. The thickness of the base plate 83 is, for example, approximately 18 mm.

When the build region limitation unit 8 is used, the maximum height of the three-dimensional object K is determined according to the heights of the first anti-scattering frame 842 and the second anti-scattering frame 823. That is, in order to prevent the material powder M from scattering onto the build table 5, during additive manufacturing, the build table 5 is preferably moved in the vertical direction within a range where the second anti-scattering frame 823 is inserted through the first anti-scattering frame 842. The second anti-scattering frame 823 is kept to be inserted through the first anti-scattering frame 842 during additive manufacturing, i.e. during repeating formation of the material layer and formation of the solidified layer. The size of the movable range of the build table 5 substantially matches the maximum height of the three-dimensional object K. Hence, a high first anti-scattering frame 842 and a high second anti-scattering frame 823 are used when additive manufacturing a high three-dimensional object K.

Figure 19:
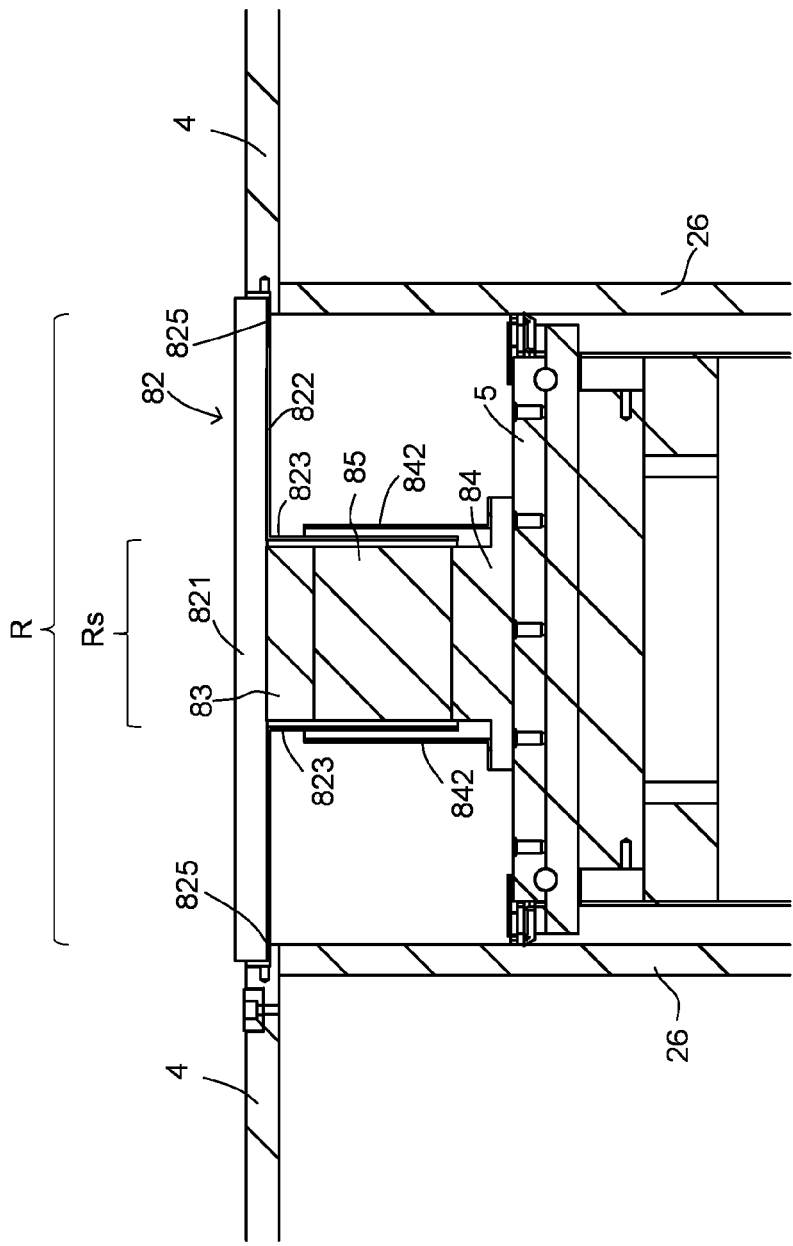
FIG. 19 shows an example of the build region limitation unit with different specifications.

When forming the first material layer 6, the upper surface of the base plate 83 needs to be positioned higher than the upper surface of the flat plate 822. That is, the base plate 83 needs to be arranged so that the upper surface of the base plate 83 is positioned higher than the upper surface of the flat plate 822 when the build table 5 is raised as much as possible within a range where interference between the members does not occur. The pedestal 841 serves as a spacer that raises the bottom of the base plate 83. If the pedestal 841 alone cannot provide a sufficient height, a connecting member 85 that is a spacer may be provided between the movable unit 84 and the base plate 83. By using the connecting member 85, the pedestal 841 can be shared even when using a relatively high first anti-scattering frame 842 and a relatively high second anti-scattering frame 823. FIG. 19 shows a state when a high first anti-scattering frame 842 and a high second anti-scattering frame 823 are used and the base plate 83 is fixed to the pedestal 841 via the connecting member 85.

By exchanging the non-movable unit 82 and the movable unit 84 according to the size of the three-dimensional object K to be additive manufactured, it is possible to change the size of the second build region Rs and the maximum height of the three-dimensional object K.

If the upper surface of the base plate 83 is positioned higher than the upper surface of the flat plate 822 even without the pedestal 841, the pedestal 841 may not be provided. At this time, the first anti-scattering frame 842 is attached directly to the build table 5. Besides, even when the pedestal 841 is provided, the first anti-scattering frame 842 may be attached directly to the build table 5.

Next, a method of attaching the build region limitation unit 8 in the chamber 1 and a method of manufacturing the three-dimensional object K using the build region limitation unit 8 will be described. Regarding the method of attaching the build region limitation unit 8, a case where the first build region recoater head 31 is replaced with the second build region recoater head 81 will be described as an example. In addition, the order of the following procedures may be changed.

First, the base plate 83 and the movable unit 84 are installed. The base plate 83 is fixed to the movable unit 84. As shown in FIG. 13, the movable unit 84 to which the base plate 83 is attached is fixed onto the build table 5.

Next, the first build region recoater head 31 is replaced with the small region recoater 81. Specifically, the blades 312, the sensor 313, the material case 311, the material case support frame 315, and the powder guide 314 are removed from the movable body 32. Then, the blades 812, the powder guide 814, the material case 811, and the sensor 813 are attached to the movable body 32. In this way, the small region recoater 81 is arranged on the base frame 4.

Then, the non-movable unit 82 is placed on the base frame 4 to cover the first build region R except for the second build region Rs. At this time, the base plate 83 is arranged within the opening 826 of the non-movable unit 82.

In this way, the movable unit 84 and the base plate 83 are attached, the first build region recoater head 31 is replaced with the second build region recoater head 81, and the non-movable unit 82 is placed. Thus, the build region limitation unit 8 is attached inside the chamber 1.

Figure 14:
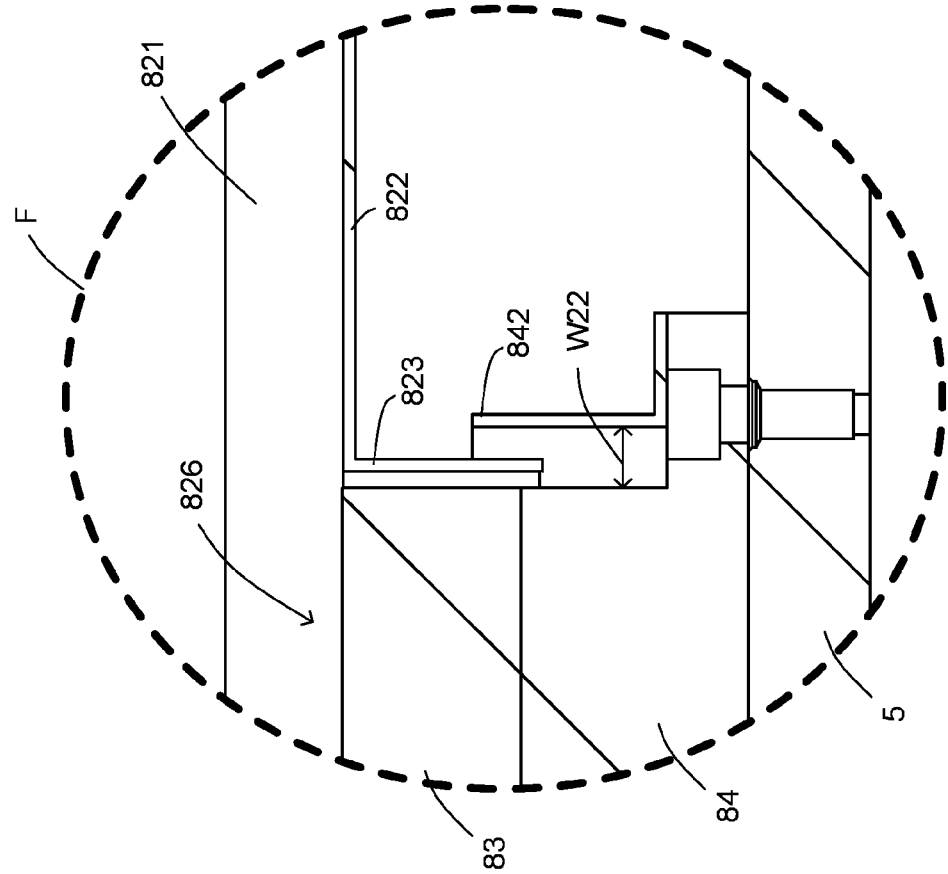
FIG. 14 is an enlarged view of F of FIG. 13.

As shown in FIG. 14, the opening of the second anti-scattering frame 823 is formed larger than the outer edges of the base plate 83 and the upper plate 841*a*. Also, the opening of the first anti-scattering frame 842 is formed larger than the outer edge of the second anti-scattering frame 823. Hence, when the build table 5 moves in the vertical direction, the outer surfaces of the base plate 83 and the upper plate 841*a* do not contact the inner surface of the second anti-scattering frame 823. Similarly, the outer surface of the second anti-scattering frame 823 does not contact the inner surface of the first anti-scattering frame 842.

After the build region limitation unit 8 is installed in the chamber 1 as described above, additive manufacturing is performed by using the build region limitation unit 8. First, the operator puts the material powder M to be used into the material inlet 811*a* of the material case 811. Then, inert gas is supplied into the chamber 1.

Here, the moving direction of the second build region recoater head 81 will be supplemented. For formation of the solidified layer, it is enough for the second build region recoater head 81 to move in only one direction across the second build region Rs. When the blades 812 are provided on both side surfaces of the movable body 32 as in this embodiment, the moving direction may be different for each material layer 6 formed. For example, the moving direction of the second build region recoater head 81 may be set so that the moving direction of the even-numbered layers is from left to right and the moving direction of the odd-numbered layers is from right to left.

Furthermore, the flow of inert gas may change depending on the position of the second build region recoater head 81. For example, the flow of inert gas may change between a case where the second build region recoater head 81 is on the left side of the second build region Rs and a case where the second build region recoater head 81 is on the right side of the second build region Rs, which in turn affects the quality of additive manufacturing. In particular, when additive manufacturing is performed by using the build region limitation unit 8 in order to examine the use of new material powder, sometimes appropriate irradiation conditions have not yet been grasped. At this time, projections are likely to be formed by spatters adhering to the solidified layer, and the blade 812 may collide with the projections when forming the material layer 6. Therefore, when using the material powder M for which the appropriate irradiation conditions have not yet been grasped, it is preferable to emphasize the stability of additive manufacturing, and move the second build region recoater head 81 reciprocatively in forming one material layer 6. By doing so, the position of the second build region recoater head 81 is constant during formation of the solidified layer, so the stability of additive manufacturing is improved.

First, the first material layer 6 and the first solidified layer are formed. The build table 5 is positioned such that the distance between the lower end of the blade 812 and the upper surface of the base plate 83 corresponds to the size of one material layer 6. Here, the second build region recoater head 81 moves reciprocatively. FIG. 1 and FIG. 2 show the reciprocating movement of the second build region recoater head 81 when the initial position of the second build region recoater head 81 is on the left side. The second build region recoater head 81 moves from the left side to the right side with respect to the second build region Rs, and then moves from the right side to the left side with respect to the second build region Rs. The material powder M is spread from the material outlet 814a between the pair of partition plates 821 to form the first material layer 6 on the base plate 83. The irradiator 13 irradiates and solidifies a predetermined portion of the first material layer 6 with the laser beam L to form the first solidified layer.

After the first solidified layer is formed, the second material layer 6 and the second solidified layer are formed. The build table 5 is lowered by one material layer 6. The second build region recoater head 81 moves reciprocatively again. The material powder M is spread from the material outlet 814a between the pair of partition plates 821 to form the second material layer 6 on the first solidified layer. The irradiator 13 irradiates and solidifies a predetermined portion of the second material layer 6 with the laser beam L to form the second solidified layer.

The above processes are repeated to form the third and subsequent solidified layers. In this manner, a plurality of solidified layers are added to manufacture the three-dimensional object K. Adjacent solidified layers are strongly adhered to each other.

The movement range of the second build region recoater head 81 may be set within a range that allows the material layer 6 to be formed on the second build region Rs. A controller (not shown) controls the second build region recoater head 81 to reciprocatively move between a position on the right side of the opening 826 and a position on the left side of the opening 826. Since the movement range of the second build region recoater head 81 only needs to cover the second build region Rs, the movement region of the second build region recoater head 81 may be set to be narrower than the movement range of the first build region recoater head 31. However, if the second build region recoater head 81 is too close to the second build region Rs during formation of the solidified layer, there is a possibility that the flow of inert gas may not be properly formed directly above the second build region Rs. In the case where the stability of additive manufacturing is emphasized, the movement range may be set such that the position of the second build region recoater head 81 during formation of the solidified layer is distant from the second build region Rs to some extent. Further, in order to prevent the material powder M from falling into the material recovery port 27b, the second build region recoater head 81 may be controlled so as not to reach the material recovery ports 27b provided at the left and right ends of the base frame 4, or a cover may be provided to cover the material recovery port 27b.

Figure 15:
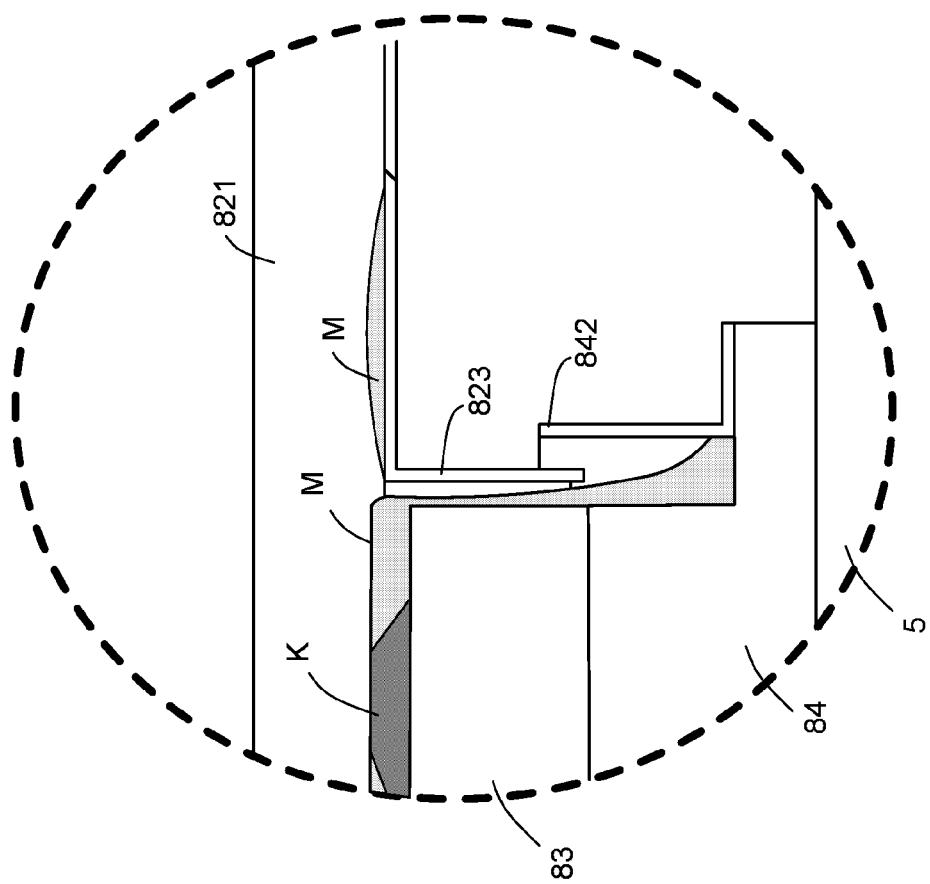
FIG. 15 shows a state where material powder is accumulated in the first anti-scattering frame.

As shown in FIG. 15, in manufacturing the three-dimensional object K, part of the material powder M supplied onto the base plate 83 falls through the gap between the base plate 83 and the second anti-scattering frame 823 and accumulates inside the first anti-scattering frame 842. Further, the material powder M extruded by the moving second build region recoater head 81 is accumulated between the pair of partition plates 821. The first anti-scattering frame 842 and the second anti-scattering frame 823 prevent the material powder M from scattering onto the build table 5 outside the first anti-scattering frame 842. The partition plate 821 prevents the material powder M from scattering onto the flat plate 822 outside the partition plate 821. In particular, by providing the groove 322 on the lower surface of the movable body 32 and inserting the partition plate 821 into the groove 322, scattering of the material powder M is more properly prevented.

The first anti-scattering frame 842 and the second anti-scattering frame 823 are not connected. Since the non-movable unit 82 and the movable unit 84 are independently provided, the build region limitation unit is easily attached or detached. By using the build region limitation unit 8 of this embodiment, it is possible to minimize the locations where the material powder M remains. Therefore, the cleaning work required when different material powder M is to be used after additive manufacturing can be performed more easily. Specifically, the inside of the first anti-scattering frame 842, the inside of the pair of partition plates 821, the upper surface of the base frame 4, and the second build region recoater head 81 may be cleaned. In particular, it is possible to prevent the used material powder M from being mixed into the material recovery unit 40 and the material supply unit 60. Therefore, when additive manufacturing is performed by using the material recovery unit 40 and the material supply unit 60 next time, the work therefor becomes simple.

The build region limitation unit 8 can be suitably used when additive manufacturing a relatively small three-dimensional object K. In the above description, a case of using the build region limitation unit 8 for manufacturing a test piece when considering the use of new material powder is taken as an example, but the build region limitation unit 8 is not limited to such an application. For example, the build region limitation unit 8 can be suitably used even when the material powder M is preheated to a high temperature for additive manufacturing. When the build region limitation unit 8 is used, the material powder M is not spread over a large portion of the build table 5. Therefore, it is possible to prevent heat from being transferred from the material powder M to the build table 5 and the surrounding members.

What is claimed is:

1. A build region limitation unit for an additive manufacturing apparatus comprising a base frame which has a first build region that is a region capable of forming a three-dimensional object, and a build table which is provided in the first build region and configured to be movable in a vertical direction and on which a base plate is arranged, and the additive manufacturing apparatus alternately repeating formation of a material layer composed of material powder and formation of a solidified layer, the build region limitation unit comprising:

a movable unit fixed to the build table;
a non-movable unit placed on the base frame,
wherein the movable unit comprises:
- a first anti-scattering frame that is a hollow frame provided to protrude upward, the non-movable unit comprises:
- a flat plate which is a plate having an opening and placed on the base frame, covers the first build region with a portion other than the opening, and forms a second build region smaller than the first build region; and
- a second anti-scattering frame which is a hollow frame provided to protrude downward at an outer periphery of the opening,
- wherein the first anti-scattering frame surrounds the second anti-scattering frame with a gap therebetween; and a second build region recoater head that forms the material layer in the second build region,
wherein the second build region recoater head comprises:
- a movable body configured to be reciprocatively movable along a first horizontal direction on the base frame;
- a material case attached to the movable body and containing the material powder;
- a material outlet discharging the material powder contained in the material case; and
- a blade attached to the movable body and leveling the material powder discharged from the material outlet to form the material layer, wherein the non-movable unit further comprises a pair of partition plates erected on an upper surface of the flat plate and arranged along the first horizontal direction across the opening, and the material outlet and the blade are arranged inside the pair of partition plates.

2. The build region limitation unit according to claim 1, wherein a pair of grooves are formed on a lower surface of the movable body, and
upper portions of the pair of partition plates are respectively inserted into the pair of grooves.

3. The build region limitation unit according to claim 1, wherein a length of the material case in a second horizontal direction orthogonal to the first horizontal direction is the same as a width of the base frame in the second horizontal direction.

4. The build region limitation unit according to claim 1, wherein a lower portion of the material case has an inverted truncated pyramid shape.

5. The build region limitation unit according to claim 1, wherein the movable unit further comprises a pedestal, and
the pedestal comprises:
an upper plate configured to be fixed to the base plate; and
a lower plate configured to be attached to the first anti-scattering frame and fixed to the build table.

6. An additive manufacturing apparatus comprising the build region limitation unit according to claim 1, the additive manufacturing apparatus comprising:
a chamber covering the first build region and the second build region;
the base frame;
the build table;
an irradiator irradiating the material powder with a laser beam or an electron beam; and
the build region limitation unit.

7. The additive manufacturing apparatus according to claim 6, further comprising a material reuse unit which comprises a sieve removing impurities from the material powder discharged from the chamber, and a material carrier conveying the material powder.

* * * * *